(12) United States Patent
Wu et al.

(10) Patent No.: US 7,563,029 B2
(45) Date of Patent: Jul. 21, 2009

(54) ROLLING ELEMENT CHAIN

(75) Inventors: Ching-Shan Wu, Taichung Hsien (TW);
Jen-Wen Chen, Taichung (TW);
Kuo-Jung Chang, Taichung (TW)

(73) Assignee: Precision Motion Industries, Inc.,
Taichung Hsien (TW)

( * ) Notice: Subject to any disclaimer, the term of this patent is extended or adjusted under 35 U.S.C. 154(b) by 381 days.

(21) Appl. No.: 11/591,387

(22) Filed: Nov. 1, 2006

(65) Prior Publication Data
US 2008/0101736 A1    May 1, 2008

(51) Int. Cl.
*F16C 29/06* (2006.01)
(52) U.S. Cl. .............................. 384/51; 384/44; 384/45
(58) Field of Classification Search .................. 384/51, 384/43–45
See application file for complete search history.

(56) References Cited

U.S. PATENT DOCUMENTS

| | | | |
|---|---|---|---|
| 6,364,086 B1 * | 4/2002 | Blaurock et al. ....... | 193/35 MD |
| 6,533,458 B2 * | 3/2003 | Itabashi ................... | 384/45 |
| 2006/0120637 A1 * | 6/2006 | Kuwabara ................ | 384/44 |
| 2007/0065055 A1 * | 3/2007 | Pan ........................... | 384/51 |
| 2008/0019622 A1 * | 1/2008 | Chen ........................ | 384/51 |

* cited by examiner

*Primary Examiner*—Thomas R Hannon
(74) *Attorney, Agent, or Firm*—Frenkel & Associates, P.C.

(57) ABSTRACT

A rolling element chain has a connecting belt and multiple retaining elements. The connecting belt is extended longitudinally and has multiple receiving holes. The receiving holes are defined at intervals through the connecting belt and have two sides opposite to each other. The retaining elements are mounted in pairs on the belt near the sides of each receiving hole and each retaining element has multiple retaining surfaces adjacent to each other. Each retaining surface has a straight segment and a projecting segment having a projecting edge. The straight segments and the projecting segments of the adjacent retaining surfaces on each retaining element are arranged in an alternative manner. The retaining surfaces on each pair of the retaining elements are opposite and facing to each other.

2 Claims, 11 Drawing Sheets

ROLLING ELEMENT CHAIN

BACKGROUND OF THE INVENTION

1. Field of Invention

The present invention relates to a chain, and more particularly to a rolling element chain that can arrange multiple rolling elements at intervals in a line.

2. Description of the Related Art

A rolling element chain is used to keep multiple rolling elements such as balls or cylindrical rollers away from each other to avoid collisions between adjacent rolling elements and prolong life span of the rolling elements. Some rolling element chains can even retain lubricant to lubricate rolling elements.

U.S. Pat. No. 6,155,718 discloses an end-present rolling element chain which has a plurality of balls, interposed portions and connecting portions. The interposed portions are interposed between the balls. The connecting portions connect the interposed portions so as to hold the balls in an arranged condition.

In the conventional chain, each interposed portion has a concave surface and a circular edge engaged with a ball to prevent the ball from falling out from the conventional chain. So, the contact area and the friction between the interposed portion and the ball are quite large. Furthermore, lubricant on the ball may be scraped easily by the circular edge of the interposed portion and a closed space between the concave surface and the ball is defined. Accordingly, replacing lubricant retained in the closed space is hard and the ball can not be lubricated well, even though the concave surface of the interposed portion can retain lubricant.

In addition, the conventional chain is commonly manufactured by injection molding with a combined mold. Because the disengagement travel of the combined mold is perpendicular to the concave direction of the concave surface, this easily causes interference between the mold and the chain and to manufacture the conventional chain is inconvenient.

Another conventional chain as shown in FIG. 1-3 of Taiwan Patent with an issue No. M243590 has multiple rolling elements and separating elements. A receiving hole is defined between adjacent separating elements to receive a rolling element.

However, the separating elements only have a capability of separating the rolling elements but cannot hold the rolling elements securely, so the rolling elements may fall out easily from the conventional chain. When the rolling elements are rolling, the rolling elements are shaking and bumping the separating elements so the friction between the rolling elements and the conventional chain is increased. In addition, lubricant cannot be retained between the rolling elements and the separating elements so the rolling elements cannot be lubricated well.

To overcome the shortcomings, the present invention provides a rolling element chain to mitigate or obviate the aforementioned problems.

SUMMARY OF THE INVENTION

The primary objective of the present invention is to provide a rolling element chain that has a less connecting area and retain and position the rolling elements well.

The rolling element chain comprises a connecting belt and multiple retaining elements. The connecting belt is extended longitudinally and has multiple receiving holes. The receiving holes are defined at intervals through the connecting belt and have two sides opposite to each other.

The retaining elements are mounted in pairs on the belt near the sides of each receiving hole and each retaining element has multiple retaining surfaces adjacent to each other. Each retaining surface has a straight segment and a projecting segment having a projecting edge. The straight segments and the projecting segments of the adjacent retaining surfaces on each retaining element are arranged in an alternative manner. The retaining surfaces on each pair of the retaining elements are opposite and facing to each other.

When the rolling elements are balls, the receiving holes are circular and each retaining element has two retaining surfaces. The projecting segment of each retaining surface has a projecting edge. The projecting edge is curved and has an inner end and an outer end that is more protrudent than the inner end so that the balls can be retained in the receiving holes fitly.

When the rolling elements are cylindrical rollers, the receiving holes are rectangular and each retaining element has three retaining surfaces. The projecting segment of each retaining surface has a projecting edge. The projecting edge is straight transversely so that the cylindrical rollers can be retained in the receiving holes fitly.

Other objectives, advantages and novel features of the invention will become more apparent from the following detailed description when taken in conjunction with the accompanying drawings.

DETAILED DESCRIPTION OF THE INVENTION

Figure 1:
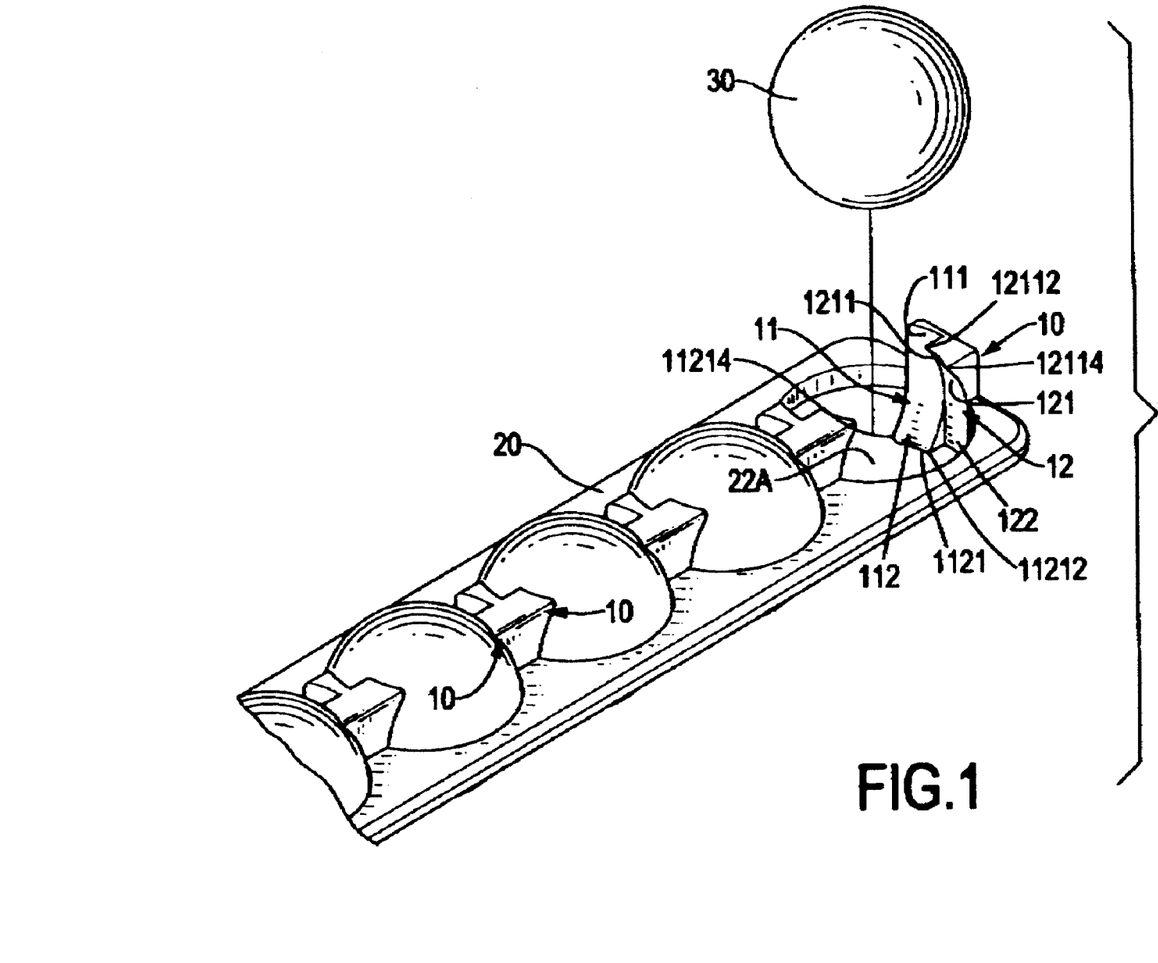
FIG. 1 is an exploded perspective view of a first embodiment of a rolling element chain in accordance with the present invention.
Figure 2:
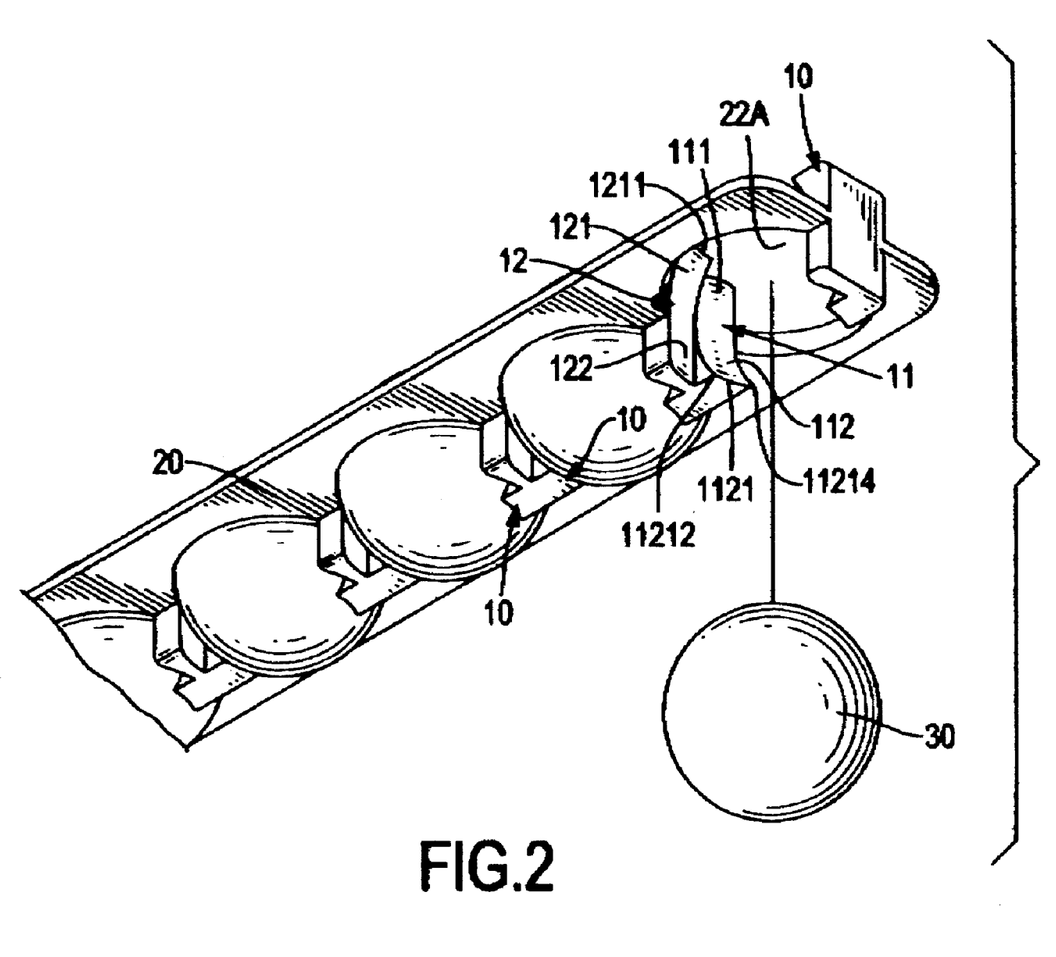
FIG. 2 is another exploded perspective view of the first embodiment of the rolling element chain in FIG. 1.
Figure 3:
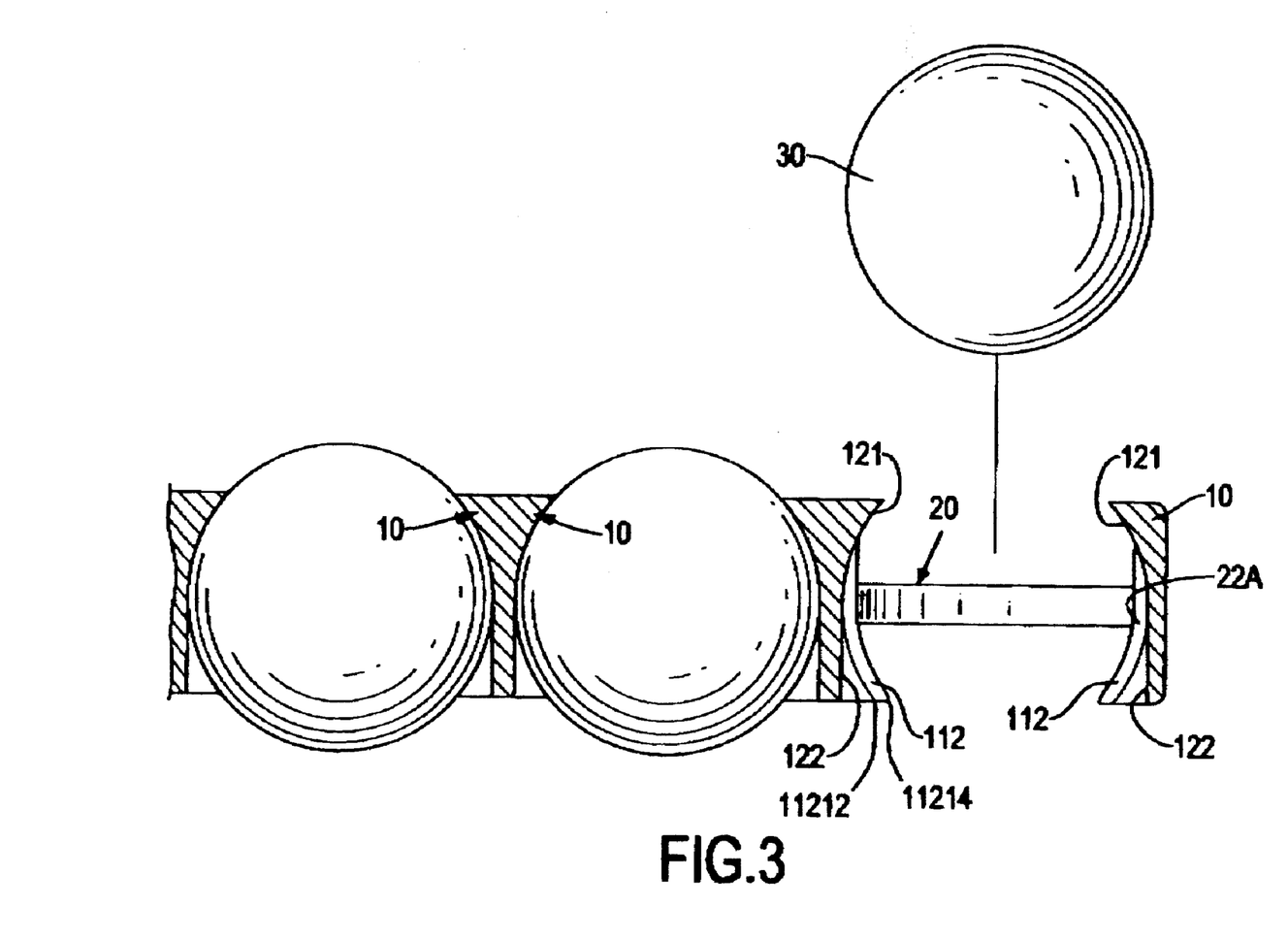
FIG. 3 is a side view in partial section of the first embodiment of the rolling element chain in FIG. 1.
Figure 7:
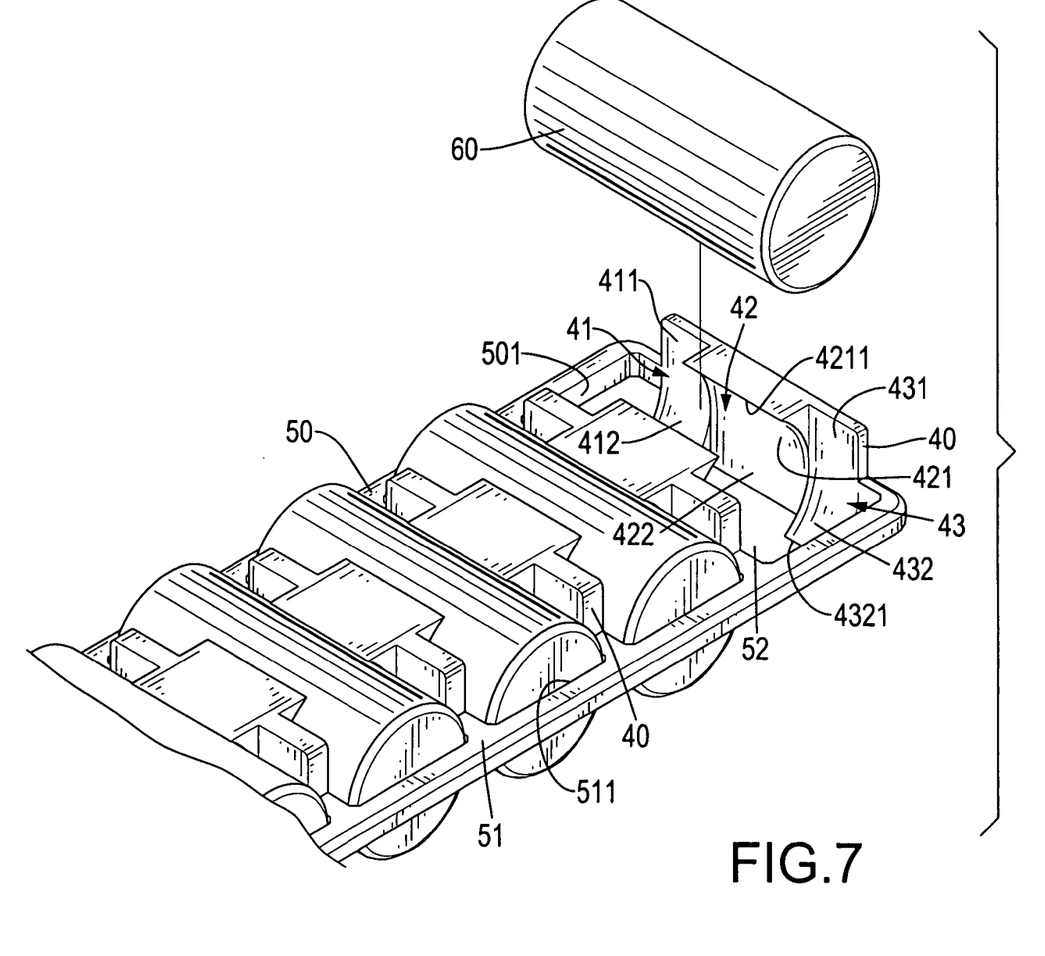
FIG. 7 is an exploded perspective view of a fifth embodiment of a rolling element chain in accordance with the present invention.

With reference to FIGS. 1 and 7, a rolling element chain in accordance with the present invention is provided to retain and arrange multiple rolling elements (30, 60) such as balls (30) or cylindrical rollers (60) at intervals in a line.

With further reference to FIGS. 2, 3, 4 and 8, the rolling element chain in accordance with the present invention comprises a connecting belt (20, 50) and multiple retaining elements (10, 40).

With further reference to FIGS. 5, 6, 9, 10 and 11, the connecting belt (20, 50) is extended longitudinally and has multiple receiving holes (22A, 22B, 52) defined at intervals through the connecting belt (20, 50). The receiving holes (22A, 22B, 52) have two sides opposite to each other and may be circular or polygonal. The rolling elements (30, 60) are received respectively in the receiving holes (22A, 22B, 52).

In a first and fourth embodiment of the chain for retaining the balls (30) in accordance with the present invention as shown in FIGS. 1, 2, 3 and 6, the receiving holes (22A) are circular to receive multiple balls (30).

Figure 4:
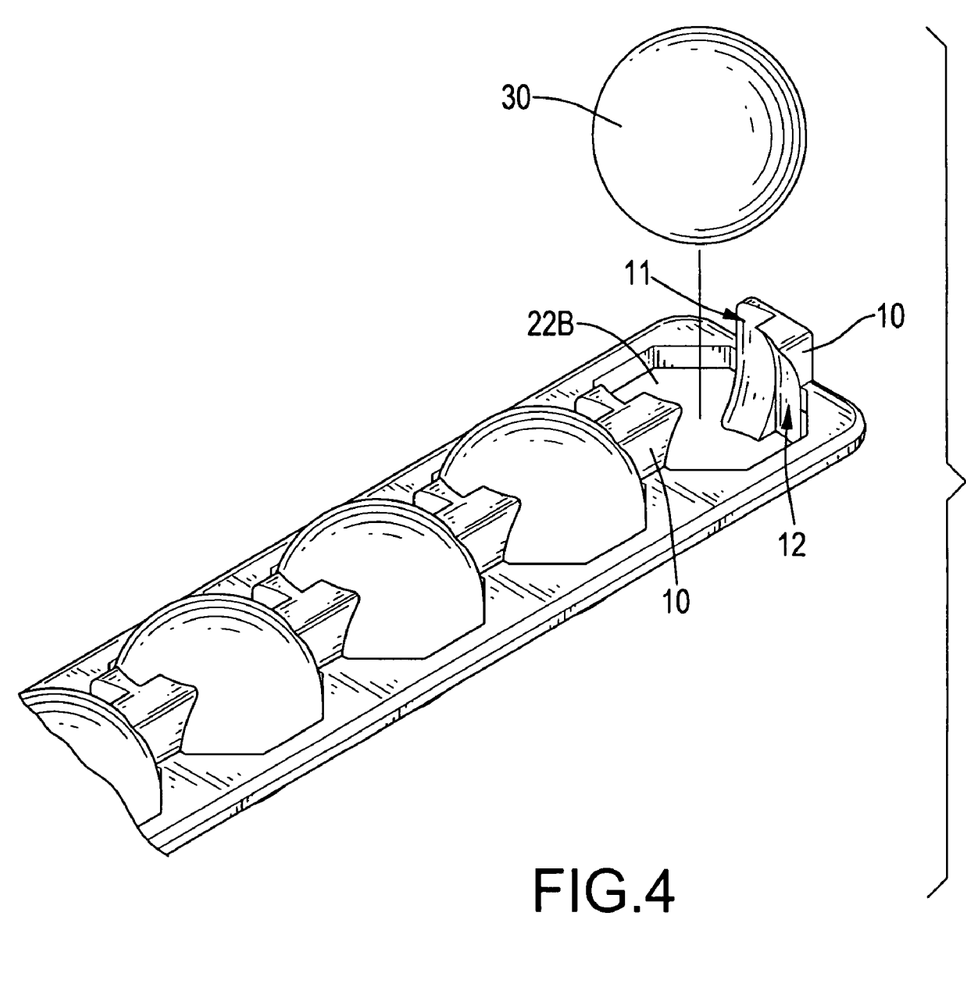
FIG. 4 is an exploded perspective view of a second embodiment of a rolling element chain in accordance with the present invention.
Figure 5:
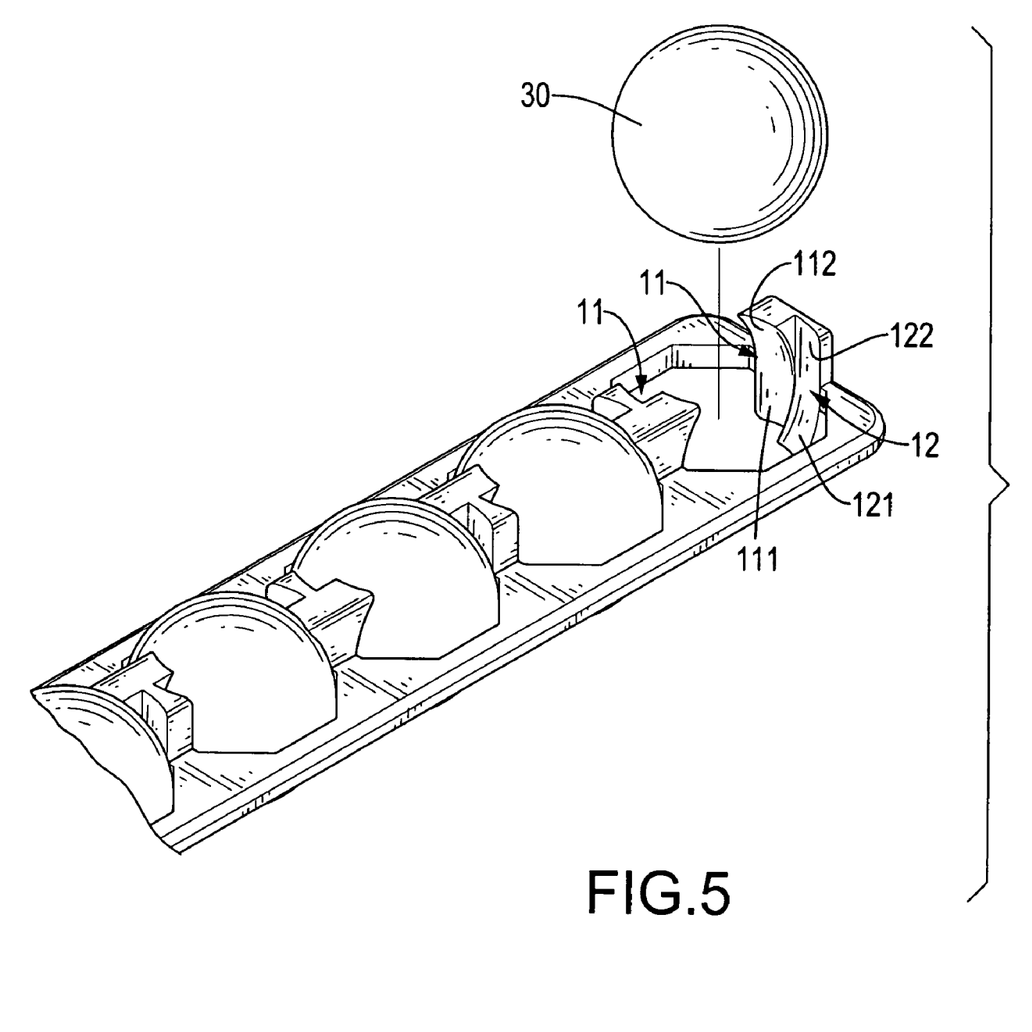
FIG. 5 is an exploded perspective view of a third embodiment of a rolling element chain in accordance with the present invention.

In a second and third embodiment of the chain for retaining the balls (30) in accordance with the present invention as shown in FIGS. 4 and 5, the receiving holes (22B) are octagonal to receive the balls (30).

In a fifth and sixth embodiment of the chain for retaining the cylindrical rollers (60) in accordance with the present invention as shown in FIGS. 7, 8, 9, 10 and 11, the receiving holes (52) are rectangular to receive multiple cylindrical rollers (60).

The retaining elements (10, 40) are mounted in pairs on the connecting belt (20, 50) near the sides of the receiving holes (22A, 22B, 52) and each retaining element (10, 40) has multiple retaining surfaces (11, 12, 41, 42, 43) adjacent to each other. The retaining surfaces (11, 12, 41, 42, 43) on each pair of the retaining elements (10, 40) face to each other. Each retaining surface (11, 12, 41, 42, 43) has a straight segment (111, 122, 411, 422, 431) and a projecting segment (112, 121, 412, 421, 432). The projecting segment (112, 121, 412, 421, 432) is cambered, is connected smoothly with the straight segment (111, 122, 411, 422, 431) and has a projecting edge (1121, 1211, 4121, 4211, 4321).

The straight segments (111, 122, 411, 422, 431) and the projecting segments (112, 121, 412, 421, 432) of the adjacent retaining surfaces (11, 12, 41, 42, 43) on each retaining element (10, 40) are arranged in an alternative manner. This means the straight segment (111, 122, 411, 422, 431) of each retaining surface (11, 12, 41, 42, 43) corresponds and is adjacent to the projecting segment (112, 121, 412, 421, 432) of the adjacent retaining surface (11, 12, 41, 42, 43).

In the first and second embodiment of the chain for retaining the balls (30) as shown in FIGS. 1, 2, 3 and 4, each retaining element (10) has a first retaining surface (11) and a second retaining surface (12). The first retaining surface (11) has a first straight segment (111) and a first projecting segment (112) having a projecting edge (1121). The projecting edge (1121) of the first projecting segment (112) is curved and has an inner end (11212) and an outer end (11214) that is more protrudent than the inner end (11212).

The second retaining surface (12) has a second straight segment (122) adjacent to the first projecting segment (112) and a second projecting segment (121) adjacent to the first straight segment (111) and having a projecting edge (1211). The projecting edge (1211) of the second projecting segment (121) is curved and has an inner end (12112) and an outer end (12114) that is more protrudent than the inner end (12112). The projecting edges (1121, 1211) of the first and second projecting segments (112, 121) are corresponding to the spherical shape of a ball (30) so the balls (30) can be retained by the retaining elements (10) fitly.

The straight segments (111, 122) and the projecting segments (112, 121) of the opposite retaining surfaces (11, 12) on each pair of retaining elements (10) are arranged in the same manner. This means that the straight segment (111, 122) of each retaining surface (11, 12) corresponds and is facing to the straight segment (111, 122) of the opposite retaining surface (11, 12).

Figure 6:
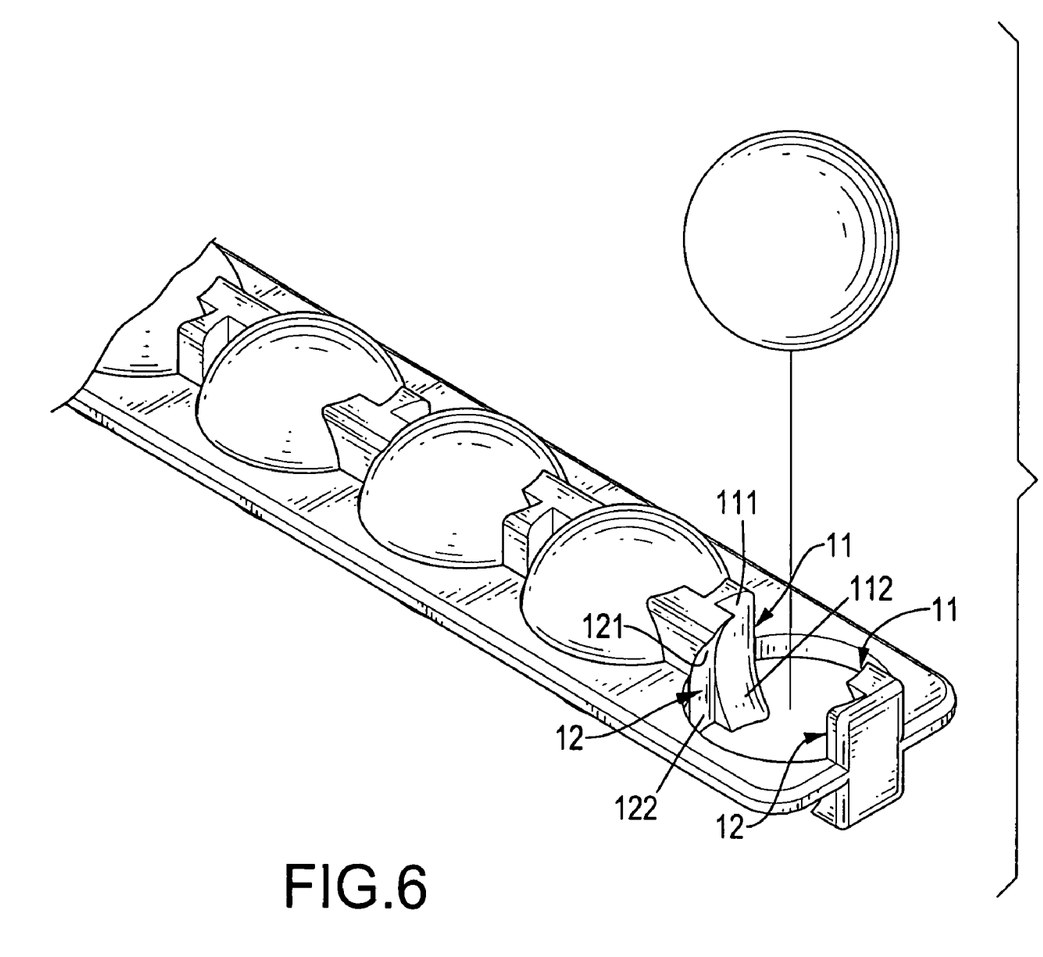
FIG. 6 is an exploded perspective view of a fourth embodiment of a rolling element chain in accordance with the present invention.

In the third and fourth embodiment of the chain for retaining balls (30) as shown in FIGS. 5 and 6, the straight segments (111, 122) and the projecting segments (112, 121) of the opposite retaining surfaces (11, 12) on each pair of retaining elements (10) are arranged in an alternative manner. This means that the straight segment (111, 122) of each retaining surface (11, 12) corresponds and is facing to the projecting segment (112, 121) of the opposite retaining surface (11, 12).

Figure 8:
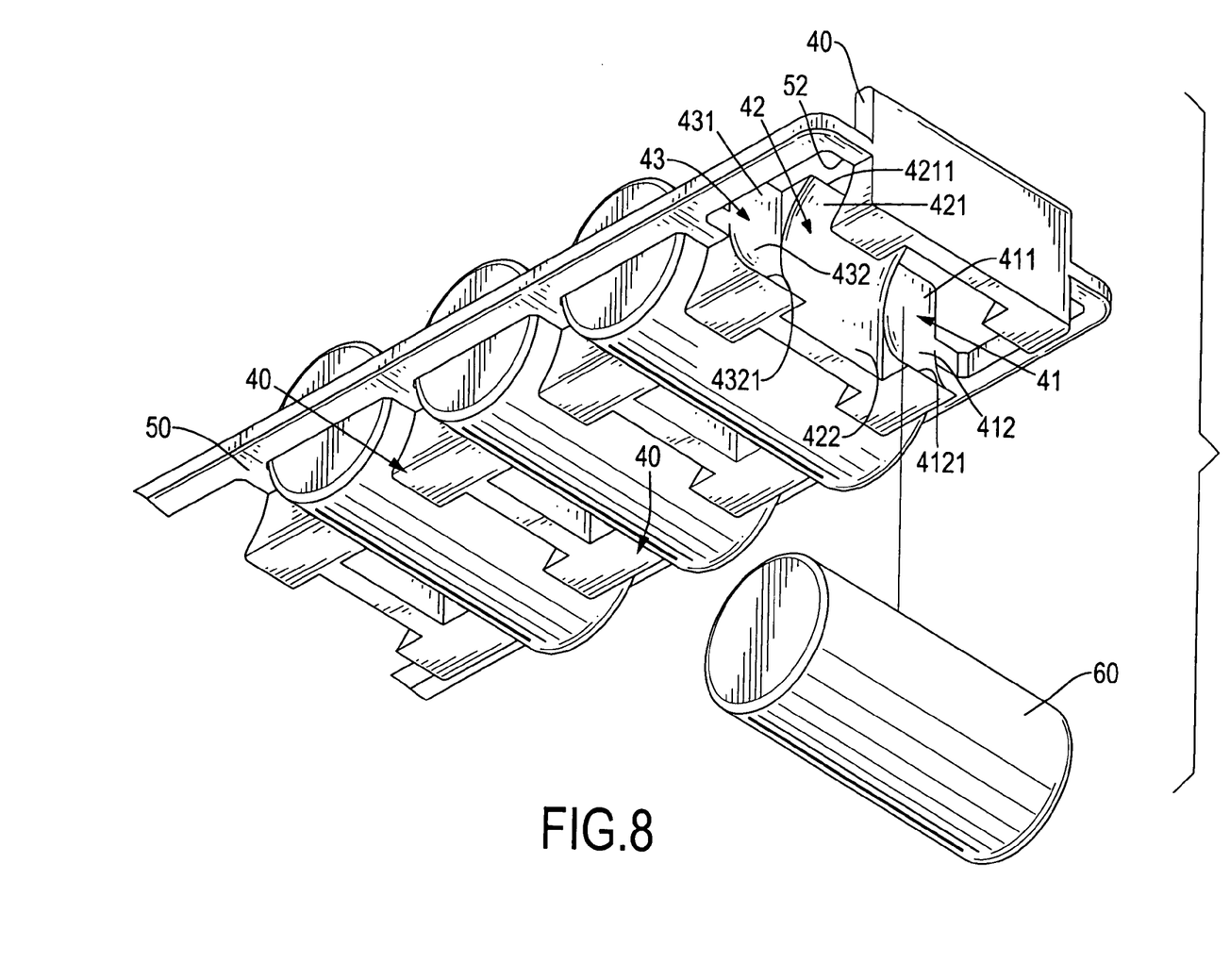
FIG. 8 is another exploded perspective view of the fifth embodiment of the rolling element chain in FIG. 7.
Figure 9:
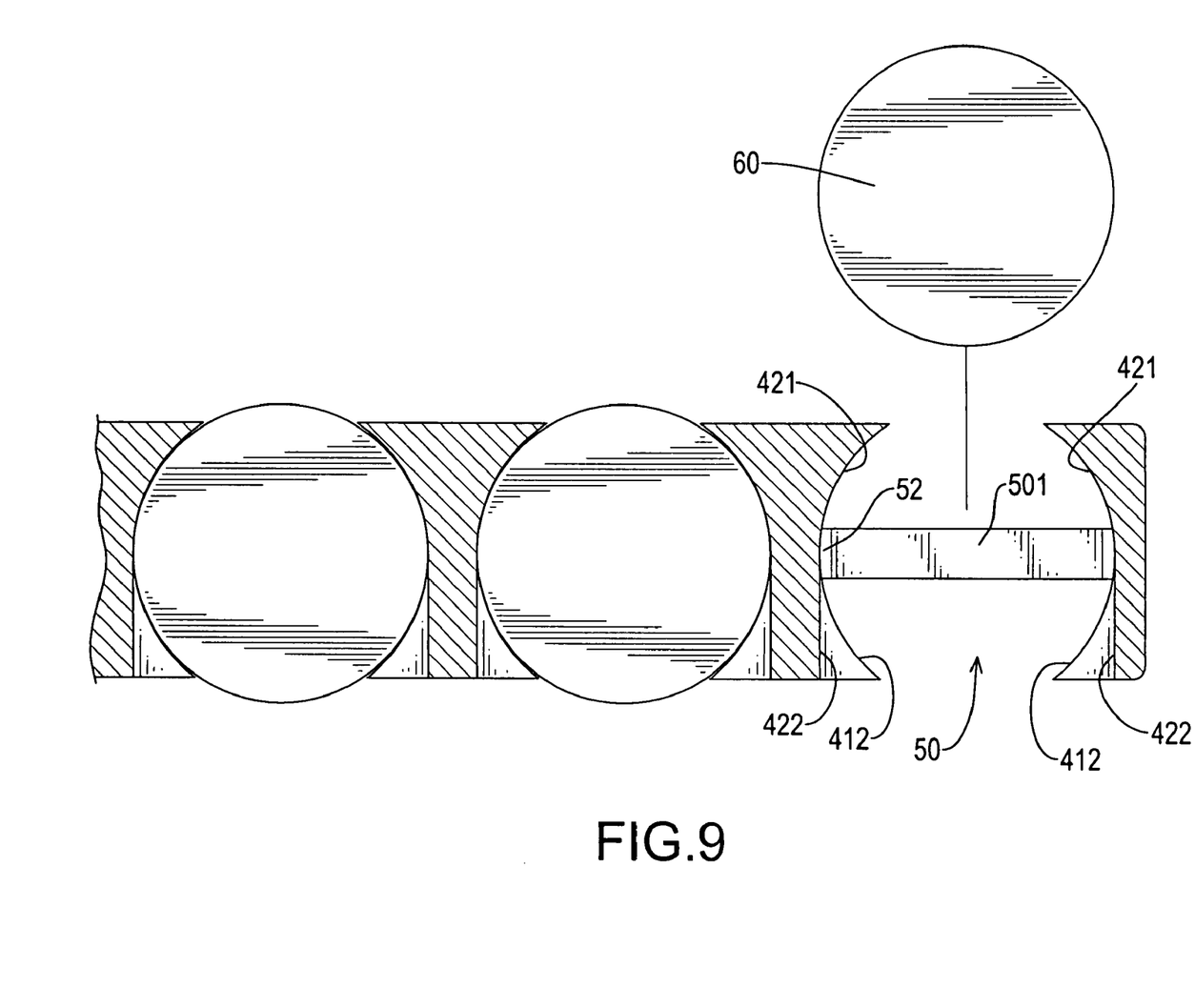
FIG. 9 is a side view in partial section of the fifth embodiment of the rolling element chain in FIG. 7.

In a fifth embodiment of the chain for retaining the cylindrical rollers (60) in accordance with the present invention as shown in FIGS. 7, 8 and 9, each retaining element (60) has a first, second and third retaining surface (41, 42, 43). The first retaining surface (41) has a first straight segment (411) and a first projecting segment (412) having a projecting edge (4121). The second retaining surface (42) has a second straight segment (422) adjacent to the first projecting segment (412) and a second projecting segment (421) adjacent to the first straight segment (411) and having a projecting edge (4211). The third retaining surface (43) has a third straight segment (431) adjacent to the second projecting segment (421) and a third projecting segment (432) adjacent to the second straight surface (422) and having a projecting edge (4321). The projecting edges (4121, 4211, 4321) of the projecting segments (412, 421, 432) are straight transversely to retain the cylindrical rollers (60) fitly.

The straight segments (411, 422, 431) and the projecting segments (412, 421, 432) of the opposite retaining surfaces (41, 42, 43) on each pair of retaining element (40) are arranged in the same manner. This means that the straight segment (411, 422, 431) of each retaining surface (41, 42, 43) corresponds and is facing to the straight segment (411, 422, 431) of the opposite retaining surface (41, 42, 43).

Figure 10:
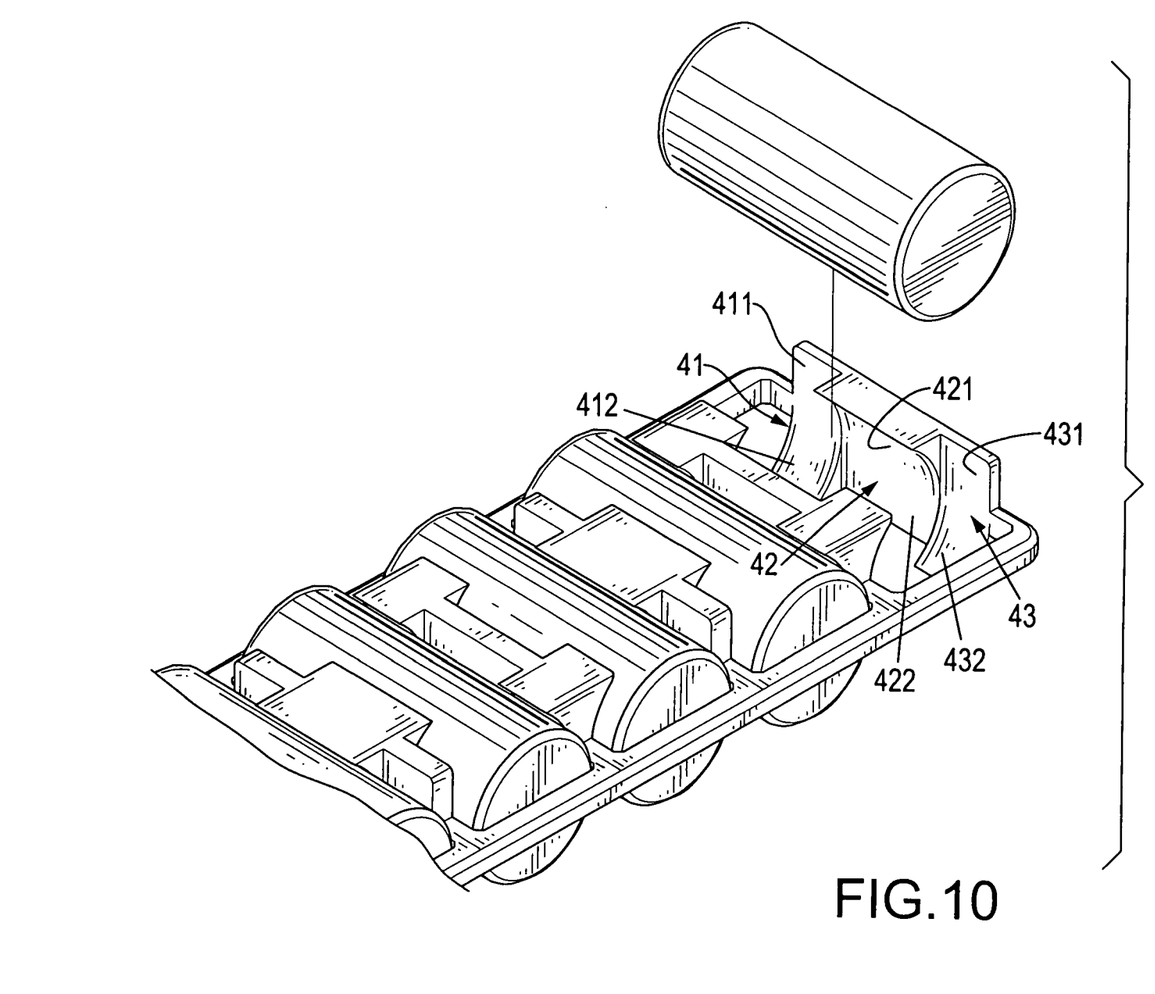
FIG. 10 is an exploded perspective view of a sixth embodiment of a rolling element chain in accordance with the present invention.
Figure 11:
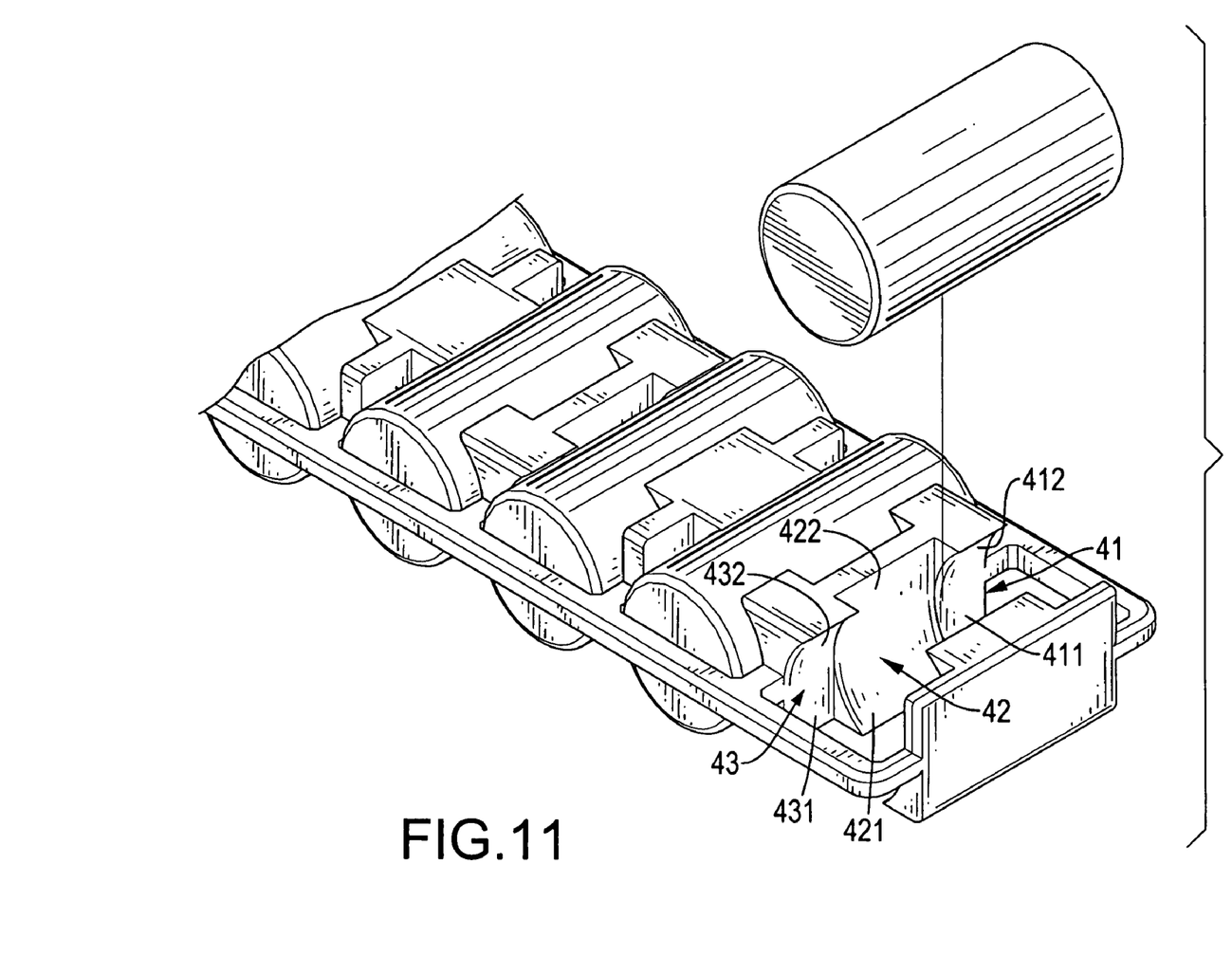
FIG. 11 is another exploded perspective view of the sixth embodiment of the rolling element chain in FIG. 10.

In a sixth embodiment of the chain for retaining the cylindrical rollers (60) in accordance with the present invention as shown in FIGS. 10 and 11, the sixth embodiment is similar to the fifth embodiment, except that the straight segments (411, 422, 431) and the projecting segments (412, 421, 432) of the opposite retaining surfaces (41, 42, 43) on each pair of retaining element (40) are arranged in an alternative manner. This means that the straight segment (411, 422, 431) of each retaining surface (41, 42, 43) corresponds and is facing to the projecting segments (412, 421, 432) of the opposite retaining surface (41, 42, 43).

The chain as described has the following advantages. The rolling elements (30, 60) are held in the chain by the projecting segments (112, 121, 412, 421, 432) on the retaining elements (10, 40) so contact area and friction between the rolling elements (30, 60) and the chain can be reduced.

Because the straight segments (111, 122, 411, 422, 431) do not abut on the rolling elements (30, 60) closely, multiple gaps are formed between the straight segments (111, 122, 411, 422, 431) and the rolling elements (30, 60) and lubricant can be retained in the gaps. When lubricant is added to lubricate the rolling elements (30, 60), lubricant can flow continuously into and out of adjacent gaps and be coated on the rolling elements (30, 60) thoroughly. Accordingly, the rolling elements (30, 60) can be lubricated persistently and friction between the rolling elements (30, 60) and the chain can be reduced.

Furthermore, because the disengagement travel of the combined mold is parallel to the straight segment (111, 122,

411, 422, 431), interference between the mold and the chain could be prevented and to manufacture the chain is convenient and economical.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A rolling element chain comprising
    a connecting belt being extended longitudinally and having
        multiple receiving holes being defined at intervals through the connecting belt and each having
            two sides opposite to each other; and
    multiple retaining elements being mounted in pairs on the belt near the sides of the receiving holes and each retaining element having
        two retaining surfaces being adjacent to each other and each retaining surface having
            a straight segment; and
            a projecting segment having a projecting edge, wherein the straight segments and the projecting segments of the adjacent retaining surfaces on each retaining element are arranged in an alternative manner; and the retaining surfaces on each pair of the retaining elements face to each other, wherein
    the receiving holes are circular; and
    each projecting edge is curved and has an inner end and an outer end which is more protrudent than the inner end.

2. The rolling element chain as claimed in claim 1, wherein the straight segments and the projecting segments of the opposite retaining surfaces on each pair of retaining elements are arranged in a same manner.

\* \* \* \* \*